A. SHREIBMAN.
RADIATOR.
APPLICATION FILED FEB. 17, 1919.

1,329,256. Patented Jan. 27, 1920.

WITNESS:
Guy M. Spring
H. B. Vrooman

INVENTOR.
Abram Shreibman
BY
Richard B. Owen
ATTORNEY.

UNITED STATES PATENT OFFICE.

ABRAM SHREIBMAN, OF KEOKUK, IOWA, ASSIGNOR OF ONE-THIRD TO J. L. BALDON AND ONE-THIRD TO J. E. SELLERS, BOTH OF ELVASTON, ILLINOIS.

RADIATOR.

1,329,256.  Specification of Letters Patent.  Patented Jan. 27, 1920.

Application filed February 17, 1919. Serial No. 277,679.

*To all whom it may concern:*

Be it known that I, ABRAM SHREIBMAN, a citizen of the United States, residing at Keokuk, in the county of Lee and State of Iowa, have invented certain new and useful Improvements in Radiators, of which the following is a specification.

This invention relates in general to motor vehicles and has special reference to the radiators of such devices.

One object of this invention is the production of a radiator for internal combustion engines of motor vehicles which is constructed so as to efficiently cool the liquid passing through the radiator.

Another object of this invention is the production of a radiator for an internal combustion engine which consists of a number of detachable parts so arranged as to facilitate the substitution of a like part very easily in case of injury to one of the original parts.

Another object of this invention is the production of a radiator for the internal combustion engine of a motor vehicle wherein a plurality of conduits are employed for connecting the upper and lower headers of the radiator to each other, these conduits being provided with a plurality of cross tubes extending therethrough, thus causing the air passing within the hood of the motor vehicle to not only pass around the conduits but also through the tubes thereof, thus assisting in cooling the liquid.

One practical form of construction and assembly of the present invention will be hereinafter described and is illustrated in the drawing—in which—

In the preferred embodiment of the present invention, about to be described, 10 indicates in general the forward portions of a hood of a motor vehicle, in which the radiator is carried, as will be hereinafter explained. This hood portion 10 is provided with supporting elements 11 whereby the device may be carried upon the chassis of the vehicle. The usual grating 12 is provided at the forward portions of the hood to present a pleasing appearance and also to assist in shielding the radiator from injury and yet at the same time allowing the passage of air therethrough.

Figure 1:
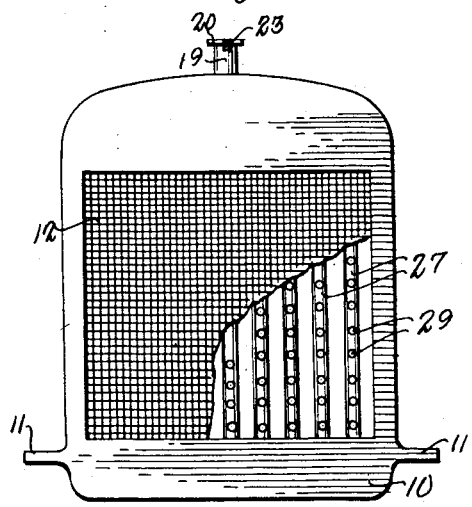
Figure 1 is a front elevation of a radiator, portions of the same being broken away to illustrate the conduits thereof.
Figure 2:
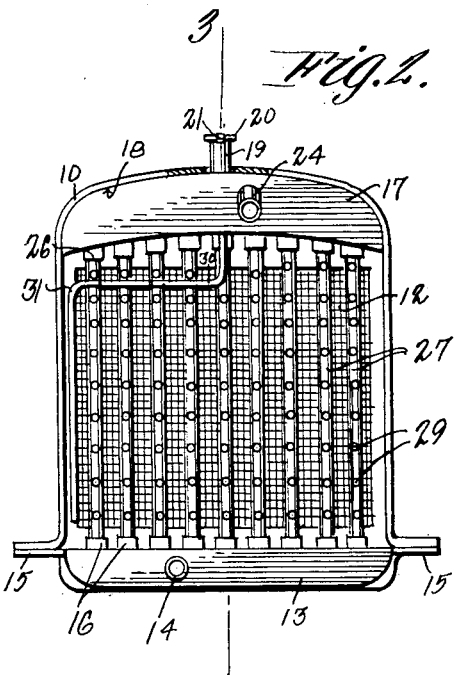
Fig. 2 is a rear elevation of the radiator.
Figure 3:
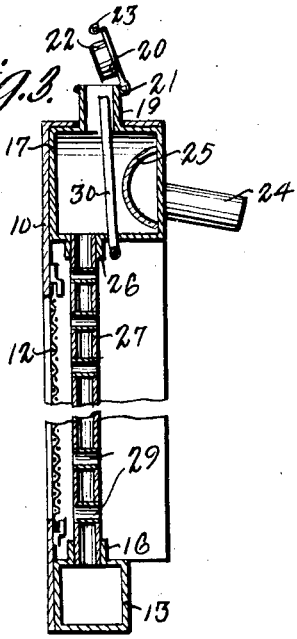
Fig. 3 is a fragmentary vertical section of the device as taken on the line 3—3 of Fig. 2.

The lower header is comparatively shallow and is elongated as is shown in Figs. 2 and 3. This lower header is carried by the lower portion of the hood 10 and has a water outlet 14 extending therefrom for facilitating the connection of the lower header to the water jacket of an internal combustion engine. This lower header is provided with plates 15 extending from its ends and bearing upon the extensions 11 of the hood whereby these plates 15 will also bear upon the chassis of the vehicle to support the radiator and relieve such supporting strain. However, the supporting element 11 may be provided with depending extensions for shielding the plates 15 from view, as indicated in Fig. 1. The lower header 13 is also provided with a plurality of upstanding internally threaded nipples 16 formed in alinement with each other and extending longitudinally of the header 13, for purposes to be hereinafter set forth. The upper header 17 is larger than the lower header 13 and has a curved upper surface 18 to conform in contour to the shape of the hood 10. The neck 19 is carried by the upper portion of the upper header 17 and extends through the upper portion of the hood 10 as indicated in Fig. 3. The cap 20 is hinged as indicated at 21 upon the neck 19 and is provided with a plug 22. This cap is also provided with a latch 23, whereby when the cap is in a closed position the plug will fit within the neck 19, while the latch will engage the neck to hold the cap against accidental opening and thus form a tight closure for the neck 19. When it is desired to fill the radiator however, the cap may be swung upwardly in the manner indicated in Fig. 3 and access to the interior of the neck may be had without dropping or losing of the cap under any conditions.

The header 17 is also provided with a water inlet 24 which allows of connection to the water jacket of an engine. The semi-circular deflecting plate 25 is carried within the upper header 17 and extends longitudinally thereof, this plate extending across the inner end of the inlet 24. Therefore, when the heated water from the water jacket of an engine passes into the upper header through the inlet 24, this heated water will be deflected by the plate 25 and finally admitted into the upper header 17, from around the ends of this plate. This upper header 17 is also provided with a line or row of nipples 26 as shown in Fig. 2.

Figure 4:
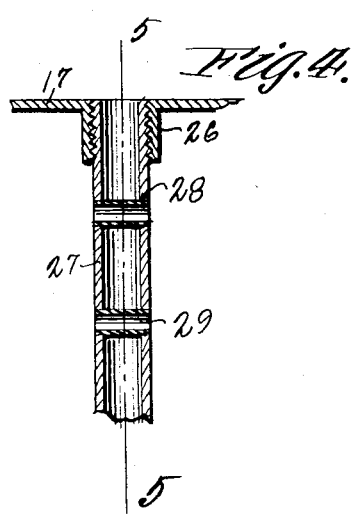
Fig. 4 is an enlarged fragmentary sectional view through one of the conduits and the support thereof.
Figure 5:
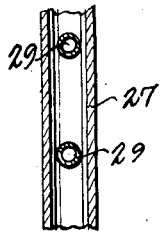
Fig. 5 is a fragmentary sectional view taken on the line 5—5 of Fig. 4.

The cooling conduits 27 are cylindrical and have threaded ends screwed into engagement with the nipple 16 of the lower header 13 and the nipple 26 of the upper header 17, as shown in Figs. 2, 3 and 4. Accordingly, the lower header is connected to the upper header by these conduits 27 while the upper reservoir is also supported by these conduits. Each conduit however is provided with a plurality of pairs of transversely extending horizontally arranged openings 28 as indicated in Fig. 4. Transversely extending comparatively short tubes 29 are passed through each conduit 27 and are carried within the openings 28 of such a conduit. It should be noted that the longitudinal axis of the tubes are in the direction of movement of the vehicle upon which the radiator is carried, thus causing the air currents passing through the hood and around the conduits to also pass through the tubes 29. It is accordingly noted that by the provision of these tubes 29 the greater cooling area is provided and consequently although the liquid would be cooled to certain extent by passing through the conduit from the upper header 17 to the lower header 13, it will be cooled to a great degree as it passes around the surfaces of the tubes 29, which are cooled by the passing of the air currents therethrough.

It is of course obvious that the usual waste pipe 30 may be provided, which extends from a point within the neck 19 downwardly through the upper header 17 and may be curved around as indicated at 31 to be adjacent one side of the hood to allow of the discharge of surplus liquid when the radiator is being filled.

It will be noted that the radiator is of such construction as to be easily removed from the hood by the removal of the connections from the water outlet 14 and the water inlet 24 and the removal of the plate 17 from the chassis of the vehicle. Accordingly, if one of the conduits is injured, it may be screwed out from engagement with the nipples and a new one quickly substituted. Accordingly, the provision of these several nipples renders the construction of the radiator more simple than the complex arrangement of the circulating system of the radiators now in use. Further by the provision of these tubes extending transversely through the conduits, a greater cooling area is provided for each conduit, thus assisting in cooling to a greater degree the liquid passing therethrough.

Furthermore, by the provision of the comparatively strong conduits, the upper header will be properly spaced above although supported by the lower header.

The foregoing description and the drawings have reference to what may be considered the preferred or approved form of my invention. It is to be understood however, that I may make such changes in construction and arrangement and combination of parts, materials dimensions, et cetera, as may prove expedient and fall within the scope of the appended claim.

Having thus fully described my invention, what I claim as new and desire to secure by Letters Patent is:—

A radiator for use in combination with an internal combustion engine including an upper header, a water inlet extending from said header, a semi-circular deflector plate extending longitudinally of said header and being carried internally thereof, said deflector plate extending across the inner end of said water inlet and having open ends, thus deflecting the liquid passed thereinto from said inlet.

In testimony whereof I affix my signature in presence of two witnesses.

ABRAM SHREIBMAN.

Witnesses:
 Geo. S. Ferguson,
 I. N. Tichenor.